Figure 1:
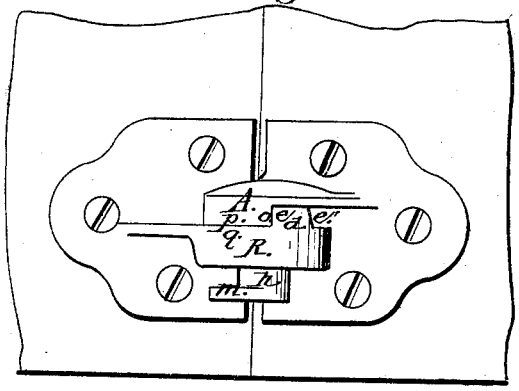
Figure 2:
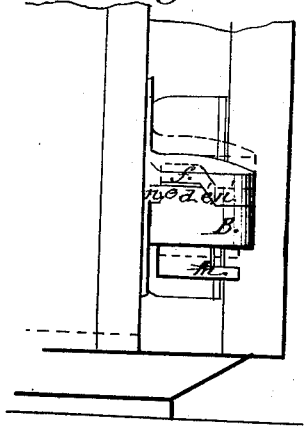
Figure 5:
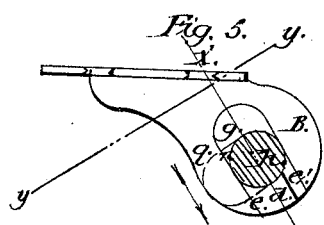
Figure 3:
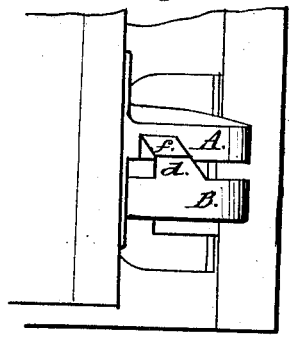
Figure 6:
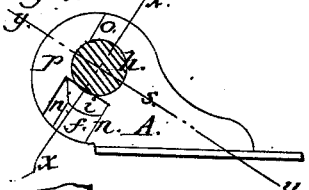
Figure 7:
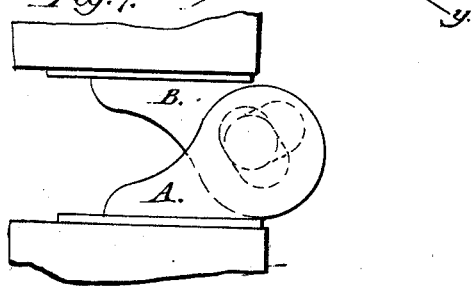
Figure 4:
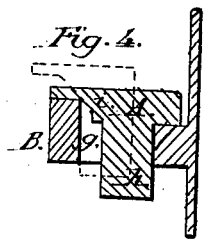

C. B. Clark,
Blind Hinge.

No. 90,500. Patented May 25, 1869.

Jno. J. Bonner
Victor H. Becker

Inventor:
Chas. B. Clark
by Forbush & Hyatt
Attys.

CHARLES B. CLARK, OF BUFFALO, NEW YORK.

Letters Patent No. 90,500, dated May 25, 1869.

IMPROVED BLIND-HINGE.

The Schedule referred to in these Letters Patent and making part of the same.

*To all whom it may concern:*

Be it known that I, CHARLES B. CLARK, of the city of Buffalo, in the county of Erie, and State of New York, have invented a certain new and useful Improvement in Blind-Hinges; and I do hereby declare that the following is a full and exact description thereof, reference being had to the accompanying drawings, making part of this specification.

My improvement relates to that class of self-fasteners in which the disengagement of the locking parts is effected by slightly raising the shutter, the joint of the hinge being made sufficiently loose for the purpose.

In addition to the ordinary function of a hinge, it is required to retain the blind in an open position, and in doing so it should maintain the shutter in a position parallel with the side of the building without rattling.

For this purpose a positive stop is desirable to prevent the closing of the shutter, and a partial one to retain it away from contact with the side of the building.

A partial stop, in place of the former, is liable to be overcome by a strong wind, when its services are most needed; while a positive stop, in place of the latter, subjects the hinge to a dangerous strain when the shutter is thrown or blown violently open; whereas a partial stop is sufficient to arrest the shutter where its momentum is not too great, and at other times, when a positive stop would be dangerous, only partially arrest it, and consequently lessen the force of the concussion against the building.

In the accompanying drawings—

Figure I is a view, in elevation, of my improved hinge as it appears from the outside when the shutter is closed.

Figure II is a half-perspective view of the same when the shutter is fastened open.

Figure III is a similar view, representing the partial stop, which retains the shutter away from contact with the building, partially overcome.

Figure IV is a vertical section in line $x\,x$, Fig. VI.

Figure V is a plan of the female portion of the hinge, representing the arrangement of the oval hole through the knuckle thereof, with the axial pin therein.

Figure VI is a bottom plan of the male portion, with the end of the axial pin cut off.

Figure VII is a plan of the hinge when the shutter is thrown open.

Like letters of reference designate like parts in each of the figures.

A is the male, and B the female portion of the hinge.

The face or upper surface of the knuckle of the female portion is constructed with a raised portion, $d$, one side of which forms a vertical shoulder, $e$, and the other an inclined one, $e'$.

The lower and contiguous face of the knuckle of the male portion A is formed with a recess, $f$, of a shape to correspond with the tongue or upward projection $d$, which fits therein, in locking the shutters open; the vertical shoulder $e$, forming the positive stop, to prevent the closing of the shutter, while the inclined shoulder $e'$ forms the partial stop to retain the blind in a position parallel with the side of the building.

The inner end of this recess is so constructed as to form an incline, $i$, to the base of the axial pin $h$, as shown in Figs. IV and VI.

The hole $g$ for the axial pin is made of oval form, arranged as shown in Fig. V, and in dotted lines, Fig. VII.

The axial pin is formed with a wing or vane, $m$, at the lower end, which prevents the unshipping of the shutter, except when in one position, which is that in which the vane-projection is made to coincide with the elongation of the oval hole $g$.

From the vertical edge $n$ of the recess $f$ the face of the knuckle of the portion A is gradually cut away, forming an incline, $s$, which terminates in the rebate or recess $o$, on the opposite side, Fig. VI, for a purpose presently to be explained.

The operation of my improved hinge, constructed as before described, is as follows:

The shutter being hung and closed, the hinge presents the appearance shown in Fig. I, in which the level portion $p$ of the face of the male knuckle rests on the level surface $q$ of the knuckle beneath, which is permitted by the rebate $o$, in which upwardly extends the ledge $d$.

In opening the shutter, the inclined surface $s$ rides on the ledge $d$, which gradually raises the shutter the height of the ledge, as indicated in red lines, Fig. II, till it has reached an open position parallel with the side of the building, when the recess $f$, coinciding with the tongue or lock $d$, permits the shutter to settle and the parts to assume the locking-position shown in black lines, Fig. II; the positive stop formed by the vertical shoulders $e\,n$, preventing the closing of the shutter, and the inclined shoulders $e'\,n'$, forming the partial stop, to retain the shutter away from the building.

In the declination of the shutter, in the act of locking, the incline $i$ serves to wedge the axial pin against the inner end of the oval opening, as shown in Fig. IV, so as to prevent any outward play of the joint, while the half-wedged shape of the tongue $d$ causes the weight of the shutter to wedge it in the recess $f$, Fig. II, and thus secure the shutter against angular play, the two features co-operating to prevent any play or rattling of the joint of the hinge, which is one of the advantages of my improved construction.

Should the force of the wind, in opening the shutter, or when blowing directly against it when open, be sufficiently strong to overcome the partial stop, it can only partially raise the shutter up the incline $n'$, as shown in Fig. III, before the blind will be arrested by the building.

As the wind abates, the gravity of the shutter, in connection with these inclined shoulders, will cause the shutter to assume its proper position parallel with the wall.

The resistance which the partial stop offers can be regulated by varying the pitch of the inclines so that it will withstand any force that can safely be brought to bear on a rigid stop, yielding only when the safety of the hinge demands it.

The shutter is released by taking hold of the bottom, and pulling slightly outward and towards the window, in the most natural and convenient direction, as indicated by the arrow in Fig. V, when the shutter is easily raised and disengaged by means of the incline $i$, which rides on the edge of the knuckle, as represented in Fig. IV.

The operation and effect of the vane $m$, to prevent the unshipping of the blind while the latter is being released, are clearly shown in Fig. V.

I am aware that an oval pintle-hole, incline, and locking-stop have been known and used by others; therefore I do not claim them, either separately or in combination; but What I do claim as my invention, is—

The locking-tongue $d$, recess $f$, inclines $e'$ and $i$, and oval hole $g$, arranged and combined to operate as herein described.

C. B. CLARK.

Witnesses:
    JAY HYATT,
    JNO. J. BONNER.